United States Patent
Ryu

(10) Patent No.: US 8,774,409 B2
(45) Date of Patent: Jul. 8, 2014

(54) METHOD OF HANDOVER

(75) Inventor: Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 529 days.

(21) Appl. No.: 12/741,361

(22) PCT Filed: Nov. 11, 2008

(86) PCT No.: PCT/KR2008/006642
§ 371 (c)(1),
(2), (4) Date: May 4, 2010

(87) PCT Pub. No.: WO2009/069902
PCT Pub. Date: Jun. 4, 2009

(65) Prior Publication Data
US 2010/0268951 A1    Oct. 21, 2010

Related U.S. Application Data

(60) Provisional application No. 60/990,612, filed on Nov. 27, 2007.

(30) Foreign Application Priority Data

Dec. 7, 2007  (KR) .................. 10-2007-0127216
Nov. 11, 2008 (KR) .................. 10-2008-0111615

(51) Int. Cl.
*H04K 1/00*  (2006.01)
*H04L 9/32*  (2006.01)
(52) U.S. Cl.
USPC ............ 380/270; 713/169; 713/170; 713/171
(58) Field of Classification Search
USPC .......................... 713/169, 170, 171; 380/270
See application file for complete search history.

(56) References Cited

U.S. PATENT DOCUMENTS

| 7,123,721 | B2 * | 10/2006 | Panjwani et al. ............ 380/270 |
| 7,127,234 | B2 * | 10/2006 | Ishii .............................. 455/411 |
| 7,631,186 | B2 * | 12/2009 | Okabe .......................... 713/168 |
| 2002/0066011 | A1 | 5/2002 | Vialen et al. |
| 2004/0131037 | A1 | 7/2004 | Balletti et al. |
| 2005/0079866 | A1 * | 4/2005 | Chen et al. ................. 455/435.1 |
| 2005/0197123 | A1 | 9/2005 | Chang et al. |
| 2005/0197126 | A1 | 9/2005 | Kang et al. |
| 2005/0208945 | A1 * | 9/2005 | Hong et al. .................. 455/436 |
| 2006/0160533 | A1 | 7/2006 | Chou et al. |
| 2006/0172738 | A1 * | 8/2006 | Kwon et al. ................. 455/439 |
| 2007/0010262 | A1 | 1/2007 | Kang et al. |

(Continued)

OTHER PUBLICATIONS

Wenhua Jiao et al., "Fast Handover Scheme for Real-Time Applications in Mobile WiMax," ICC 2007 IEEE International Conference, pp. 6038-6042, Jun. 2007.

*Primary Examiner* — Mohammad W Reza
(74) *Attorney, Agent, or Firm* — Lee, Hong, Degerman, Kang & Waimey

(57) ABSTRACT

A method for quickly performing a handover in a wireless access system is disclosed. The method for quickly performing a handover includes transmitting a handover request message to a serving base station (SBS), receiving a handover response message from the serving base station (SBS), and transmitting an uplink sequence generated by authentication-associated information of the serving base station (SBS) to a target base station (TBS). Therefore, a mobile station (MS) can complete the handover without exchanging a ranging message with the target base station (TBS), such that a communication interruption time can be minimized.

7 Claims, 12 Drawing Sheets

(56) References Cited

U.S. PATENT DOCUMENTS

| | | |
|---|---|---|
| 2007/0037576 A1* | 2/2007 | Subramanian et al. ........ 455/436 |
| 2007/0218896 A1* | 9/2007 | Altshuller et al. ......... 455/432.1 |
| 2007/0230707 A1* | 10/2007 | Blom et al. ................... 380/277 |
| 2007/0249352 A1* | 10/2007 | Song et al. .................... 455/436 |
| 2008/0299972 A1* | 12/2008 | Weese ........................... 455/436 |
| 2009/0011790 A1 | 1/2009 | Lee et al. |
| 2009/0161555 A1* | 6/2009 | Chung ....................... 370/241.1 |

* cited by examiner

METHOD OF HANDOVER

CROSS-REFERENCE TO RELATED APPLICATIONS

This application is the National Stage filing under 35 U.S.C. 371 of International Application No. PCT/KR2008/006642, filed on Nov. 11, 2008,which claims the benefit of earlier filing date and right of priority to Korean Application No. 10-2007-0127216, filed on Dec. 7, 2007, and Korean Application No. 10-2008-0111615, filed on Nov. 11, 2008, and also claims the benefit of U.S. Provisional Application Serial No. 60/990,612, filed on Nov. 27, 2007.

TECHNICAL FIELD

The present invention relates to a wireless access system, and more particularly to a method for quickly performing a handover.

BACKGROUND ART

A general handover and initial network entry process will hereinafter be described in detail.

FIG. 1 is a flow chart illustrating a method for performing a handover and initial network entry process.

Referring to FIG. 1, a mobile station (MS) selects a cell to enter the initial network or to perform the handover at steps S101 and S102. During this cell selection, the mobile station (MS) performs scanning or ranging for at least one base station in order to search for an appropriate base station for either a network connection or a handover. The mobile station (MS) may schedule a scan period or a sleep period to determine whether or not the mobile station (MS) can enter an initial network for the base station or a target base station.

When the mobile station (MS) enters the initial network, it can be synchronized with a serving base station (SBS) simultaneously while acquiring downlink parameters from the serving base station (SBS) at step S103. In this case, the SBS may provide a service over the network desired by the MS. The MS establishes synchronization with the SBS, and then acquires uplink parameters for the SBS at step S104. The MS performs the ranging process with the SBS, and adjusts the uplink parameters along with the SBS at step S105. By the above-mentioned steps, the MS and the SBS form basic functions for communication at step S106. The SBS authorizes the mobile station (MS) and exchanges keys with this MS at step S107. So, the MS is registered in the SBS at step S108, and establishes an IP connection to the SBS at step S109.

The SBS transmits operation parameters to the MS, such that it can communicate with the MS at step S110. A connection between the MS and the SBS is established at step S111, such that the MS and the SBS can carry out normal operations at step S112. The MS can continuously search for a neighboring base station while the SBS performs normal operations at step S113. As the MS becomes distant from the SBS while in motion, a quality of service (QoS) provided from the SBS is gradually lowered, such that the mobile station (MS) must continuously search for the neighboring base station capable of providing better services. In this case, the neighboring base station providing a service better than that of the SBS is called a target base station (TBS), and the MS searches for the TBS, such that this MS can be handed over to the searched TBS.

Generally, the handover is carried out when the MS moves from the serving base station (SBS) to the target base station (TBS). Namely, the handover is carried out when a radio interface, service flow, and a network access point of the MS are shifted from the SBS to the TBS. If the MS, the SBS, or a network administrator decides the handover at step S114, the handover is started.

The MS selects the TBS at step S115, can establish synchronization with the TBS, and can also acquire downlink parameters from the TBS at step S116. The MS acquires uplink parameters from the TBS at step S117, performs the ranging process with the TBS, and adjusts the uplink parameters along with the TBS at step S118. In this case, if the MS has received an NBR-ADV message including an identifier of the TBS, a frequency, and uplink/downlink channel descriptors (UCD/DCD), the scanning process and the synchronization process can be simplified. If the TBS receives a handover notification message from the SBS over a backbone network, a non-competitive initial ranging opportunity may be provided to a UL-MAP.

By the above-mentioned procedure, the MS and the TBS form basic functions at step S119. The MS and the TBS perform the ranging process to start re-entering the network. Also, the MS is re-registered in the TBS, and establishes a re-connection to the TBS at step S120. So, the MS is registered in the TBS at step S121, and an IP connection from the TBS is re-established in the MS at step S122. As a result, the TBS serves as the SBS, such that it can provide the MS with necessary services.

The handover of FIG. 1 will hereinafter be described in detail. The MS re-selects the cell on the basis of neighboring base station information acquired by the scanning, and is handed over from the SBS to the TBS. Therefore, the MS establishes synchronization with the TBS and performs the ranging process with the TBS. Thereafter, the TBS performs reauthorization for the MS. Herein, the TBS can request information of the MS from the SBS over a backbone network.

The handover and network reentry process can be greatly simplified according to MS-associated information owned by the TBS. Some network entry processes may be omitted according to an amount of MS-associated information owned by the TBS.

If the MS moves from a cell area of a current SBS to a cell area of a TBS, it performs a handover to the TBS, and performs a ranging process.

The term 'Ranging' is indicative of a set of processes for maintaining an RF communication connection quality (especially, synchronization) between the base station and the MS in an IEEE 802.16 or a portable Internet. In case of a downlink for an OFDMA-based multiple accesses, the base station transmits several mobile stations at one reference time, such that the above ranging process has no problems. However, in case of an uplink, several mobile stations transmit different signals, such that they may have different propagation delays in the uplink. Therefore, the base station and the mobile station perform the ranging process using an additional timing synchronization method for coping with different propagation delays. That is, the ranging process is needed for several mobile stations to correctly adjust synchronization of a transmission (Tx) time.

There are a variety of methods which can acquire uplink synchronization between the mobile station and the base station simultaneously while performing a power control between them, for example, an initial ranging method, a periodic ranging method, and a hand-off (HO) ranging method. In addition, there may also be used a bandwidth request (BR) ranging method for allowing the mobile station to request a bandwidth from the base station.

If the mobile station initially enters an area of the base station (e.g., if the mobile station is powered on or is shifted from an idle mode to an effective or valid mode), the initial ranging process is used for the initial network entry and combination process. The periodic ranging is periodically transmitted such that the mobile station is able to track synchronization of the base station. The hand-off (HO) ranging is carried out by the mobile station such that the mobile station is able to establish synchronization with the target base station (TBS) during a handoff (or a handover) time. The bandwidth request (BR) ranging is transmitted such that the mobile station is able to request an uplink allocation from the base station. The BR ranging is transmitted from only the mobile station which has established synchronization with a system.

If the base station receives a ranging request message from the mobile station, it generates a connection identifier (CID) of the corresponding mobile station. Thereafter, the base station performs a variety of processes on the mobile station, for example, a renegotiation process, a reauthentication process, and a reregistration process.

DISCLOSURE OF INVENTION

Technical Problem

With the increasing development of communication technologies, the number of real-time services requested between mobile stations or between each mobile station and the base station is also rapidly increasing. In order to satisfy a QoS (Quality of Service) in association with a service sensitive to a delay such as a real-time service, a time consumed for a handover needs to be reduced.

A method for simplifying a ranging request and a response message which are communicated between a mobile station and a target base station may be considered. Also, there are needs to prevent not only a loss of packets caused by a handover but also an increase of a handover delay time.

The present invention has been devised to solve the above-mentioned technical needs.

An object of the present invention is to provide a method for allowing a mobile station to access a target base station using an uplink sequence (i.e., an authenticated handover ranging code) generated by an authentication key (AK) during a handover.

Another object of the present invention is to provide a method for omitting a ranging request and a response message using an uplink sequence or a method for omitting a ranging response message by transmitting only a ranging request message.

Another object of the present invention is to provide a method for receiving an index of an uplink sequence encrypted by an authentication key (AK) of a mobile station from a base station, and then accessing a target base station using a corresponding uplink sequence.

Another object of the present invention is to provide a method for updating connection information of a mobile station using a handover message related to a serving base station, and then allowing the mobile station to access a target base station (TBS) using an authenticated signal.

Technical Solution

In order to solve the above-mentioned technical needs, the present invention relates to a wireless access system, and more particularly to a method for rapidly performing a handover.

To achieve these objects and other advantages and in accordance with the purpose of the invention, as embodied and broadly described herein, a method for quickly performing a handover includes: transmitting a handover request message to a serving base station (SBS); receiving a handover response message from the serving base station (SBS); and transmitting an uplink sequence generated by authentication-associated information of the serving base station (SBS) to a target base station (TBS).

The uplink sequence may be generated when an authentication key of the serving base station (SBS) is used as a seed of a pseudo random bit sequence (PRBS) generator, and the generated uplink sequence may be transmitted to the target base station (TBS). In this case, the uplink sequence may be contained in a ranging request message such that the resultant ranging request message may be transferred to the target base station (TBS).

The method may further include: prior to the transmitting the handover request message, receiving a message indicating whether or not the uplink sequence generated by the authentication-associated information is supported.

The method may further include: receiving uplink resources from the target base station (TBS) or receiving downlink data from the target base station (TBS); and employing the uplink resources or the downlink data by a mobile station (MS), thereby performing mutual authentication between the mobile station (MS) and the target base station (TBS).

The handover response message may include specific information indicating whether or not the uplink sequence generated by the authentication-associated information is supported. The handover response message may further include an index of the uplink sequence. The uplink sequence index acting as a value predetermined by the serving base station (SBS) is not contained in the handover response message, but is transferred from the serving base station (SBS) to at least one mobile station (MS) via an advertisement message.

The handover response message may further include connection update information. The connection update information may include at least one of a basic connection identifier (BCID), a primary connection identifier (PCID), and a transport connection identifier (TCID), which are used by the target base station (TBS). The handover response message may further include connection update information of the target base station (TBS) and information of an action time at which a handover to the TBS is performed.

The authentication-associated information may be generated by a least significant bit (LSB) of an authentication key (AK) generated when a mobile station (MS) is registered in the serving base station (SBS).

In another aspect of the present invention, there is provided a method for quickly performing a handover, the method comprising: receiving a handover notification message including authentication-associated information of a mobile station (MS) from a serving base station (SBS); and receiving an uplink sequence generated by the authentication-associated information from the mobile station (MS).

Advantageous Effects

The present invention has the following effects.

According to embodiments of the present invention, a mobile station is able to perform a handover without exchanging ranging messages with a target base station. According to embodiments of the present invention, the mobile station is able to generate an initial uplink sequence using an authentication key (AK). In this case, the mobile station is able to transmit the uplink sequence to the target base station using either an arbitrary access channel received from the target base station or uplink resources dedicated for the mobile station. Therefore, the target base station can simultaneously perform a handover and a mobile station authentication, such that a communication disconnection time caused by the handover can be minimized.

Also, the mobile station transmits a ranging request message to a target base station, and the target base station is able to authenticate the mobile station. The target base station is able to immediately perform uplink resource allocation and downlink data transmission without transmitting the ranging response message, such that a communication disconnection time caused by a handover can be reduced.

Also, the present invention updates connection information of the mobile station using a handover message related to a serving base station, such that a delay time caused by the handover can be greatly reduced.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
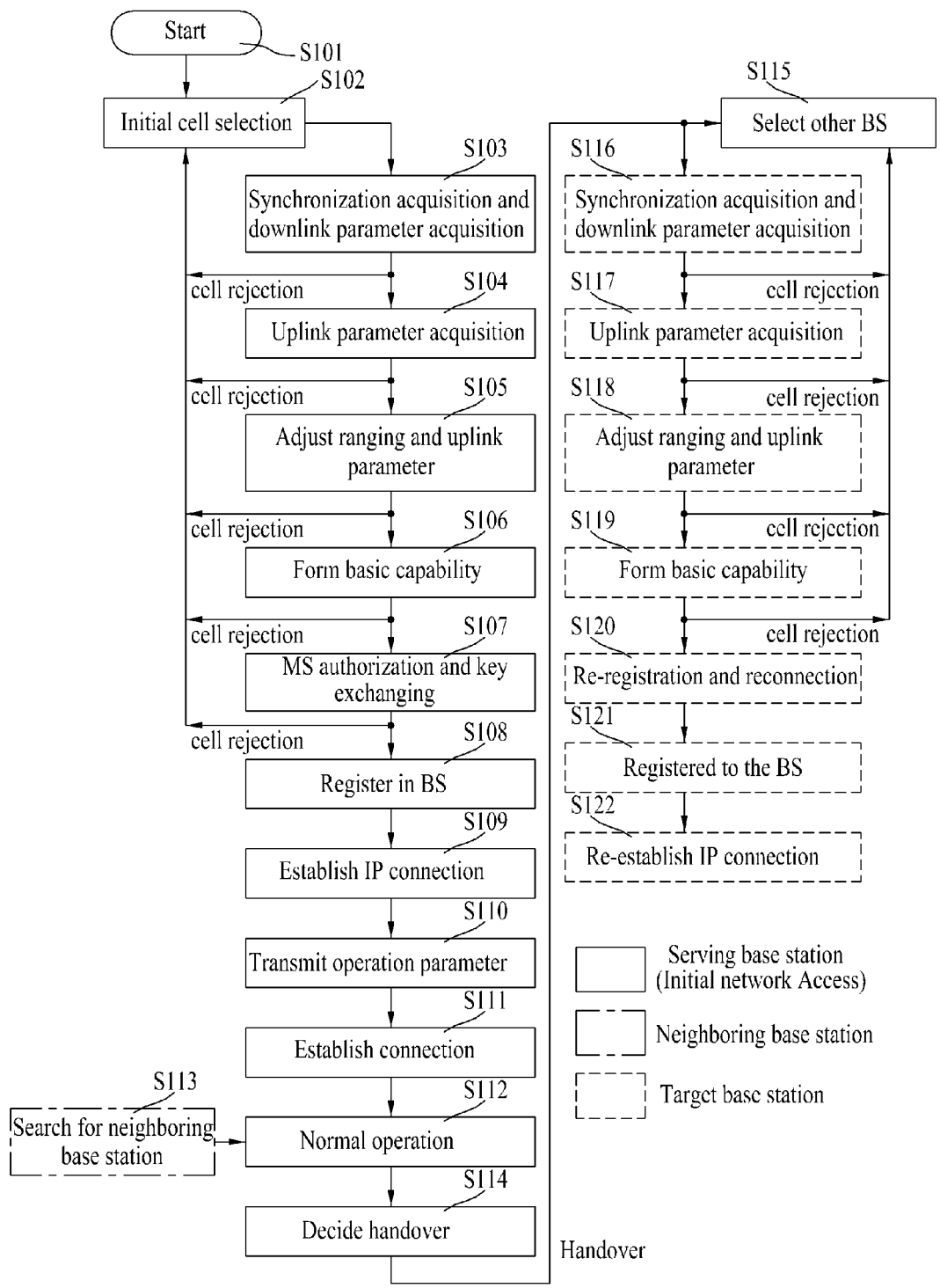
FIG. 1 is a flow chart illustrating a method for performing a handover and initial network entry process.

Reference will now be made in detail to the preferred embodiments of the present invention, examples of which are illustrated in the accompanying drawings.

The present invention relates to a wireless access system, and more particularly to a method for quickly performing a handover.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with a terminal in a network composed of several network nodes including the base station will be conducted by the base station or other network nodes other than the base station. The term "Base Station" may be replaced with a fixed station, Node-B, eNode-B (eNB), or an access point as necessary. The term "terminal" may also be replaced with a user equipment (UE), a mobile terminal, a mobile station (MS) or a mobile subscriber station (MSS) as necessary.

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The following embodiments of the present invention may be supported by standard documents disclosed in at least one of various wireless access systems, for example, the IEEE 802 system, the 3GPP system, the 3GPP LTE system, and the 3GPP2 system. In other words, unexplained steps or parts for definitely disclosing the technical idea of the present invention may be supported by the above-mentioned documents. Also, all the terms or terminologies disclosed in the present invention may be explained by the above-mentioned standard documents. Specifically, the embodiments of the present invention may be supported by at least one of standard documents (i.e., P802.16-2004, P802.16e-2005, and P802.16Rev2) of the IEEE 802.16 system.

Prior to describing the present invention, it should be noted that specific terms disclosed in the present invention are proposed for the convenience of description and better understanding of the present invention, and the use of these specific terms may be changed to another format within the technical scope or spirit of the present invention.

A variety of methods for allowing a mobile station to perform a handover in a broadband wireless access system have been recently developed, for example, an optimized hard handover (i.e., optimized HardOver), a fast handover (i.e., a fast BS switching), and a macro diversity HO.

The optimized hard handover shares mobile station information between a target base station and a serving base station, and minimizes a network registration procedure of the mobile station during a handover, such that a communication disconnection time between the mobile station and the base station can be reduced.

The fast BS switching sets several neighboring base stations having a good channel status to a diversity set of the mobile station, and allows the mobile station to quickly select the base station contained in the diversity set, such that a communication disconnection time caused by a handover can be reduced.

The micro diversity HO constructs several diversity sets having a good channel status in the same manner as in the fast BS switching. However, the mobile station simultaneously transmits and receives data to/from several base stations contained in the diversity set, such that it can acquire a desired gain.

For the convenience of description and better understanding of the present invention, various embodiments of the present invention will be applied to the optimized HardOver, and detailed descriptions thereof will hereinafter be described in detail. However, it should be noted that the present invention may also be applied to other handover methods according to user requirements or system environments.

Figure 2:
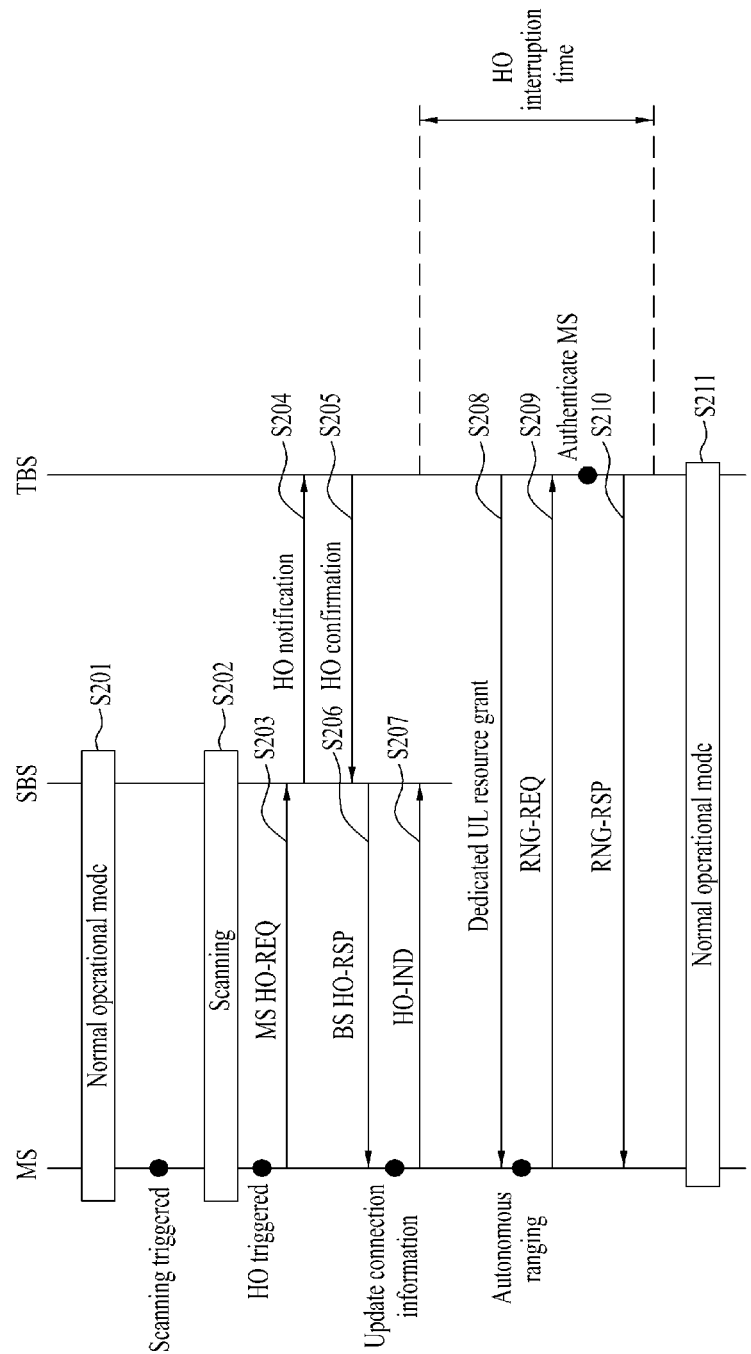
FIG. 2 is a flow chart illustrating a handover procedure according to one embodiment of the present invention.

FIG. 2 is a flow chart illustrating a handover procedure according to one embodiment of the present invention.

Referring to FIG. 2, a mobile station (MS) is registered in a serving base station (SBS). The MS performs normal operations with the SBS, for example, a method for transmitting and receiving data to/from the SBS at step S201.

While the MS receives data from the SBS, a quality of a downlink signal received from the SBS may be unexpectedly less than a predetermined level. In this case, the MS may perform a scanning process for measuring a channel quality of a neighboring base station. The MS may decide a handover to a neighboring base station on the basis of the neighboring base station's channel quality information acquired by the above scanning process at step S202.

In order to perform a handover to a target base station (TBS), the MS can transmit a handover request message (e.g., an MS HO-REQ) to the serving base station (SBS) at step S203.

Upon receiving the handover request message from the MS, the SBS transmits a HO-notification message to the TBS at step S204, such that it informs that the MS will be handed over to the TBS.

At step S204, the SBS may further include connection identifier information (e.g., a transport CID) currently provided to the MS in the HO-notification message, such that the SBS transmits the resultant HO-notification message including the connection identifier information to the TBS.

The TBS further includes connection information (CI) used by the TBS in a HO-confirmation message, such that the TBS transmits the resultant HO-confirmation message to the SBS at step S205.

At step S205, the connection information (CI) may further include a connection identifier (CID). The CID information may further include a basic CID, a primary CID, and a transport CID.

The steps S204 and S205 can be carried out over a backbone network between the SBS and the TBS. By the steps S204 and S205, the SBS and the TBS exchange MS information with each other, such that a method for preparing for a handover of the mobile station (MS) can be carried out.

The SBS can transmit a handover response message (e.g., a BS HO-RSP) to the MS. The handover response message may include information of an appropriate TBS to which the MS will be handed over, and may include an initial uplink access time related to the TBS. The SBS may further include connection information used by the TBS in the handover response message, such that it transfers the resultant handover response message including the connection information to the MS at step S206.

By the step S206, the MS may pre-update connection information used by the TBS before completing the handover to the TBS.

The MS transmits a handover indication message (e.g., a HO-IND) to the SBS, such that it finally informs the SBS of the handover to the TBS, and terminates a connection to the SBS at step S207.

The TBS transmits a dedicated UL resource grant message to the MS at step S208. The MS is able to establish downlink synchronization with the TBS using the dedicated UL resource grant message. Also, the MS can transmit an uplink message to the TBS using uplink resources received from the TBS at step S208.

According to this embodiment of the present invention, the MS performing the optimized handover can adjust uplink transmission parameters alone, such that it can establish uplink transmission synchronization with the TBS. Also, the MS may receive uplink resources from the TBS, such that it is able to transmit a ranging request message (e.g., RNG-REQ message) to the TBS. In this case, the MS may generate a message authentication code using an authentication key (AK), which has been used when receiving services from the SBS. The MS includes a message authentication code in the ranging request message, such that it is able to transmit the message authentication code to the target base station (TBS) at step S209.

The TBS having received the ranging request message from the MS may decide the presence or absence of MS authentication using a message authentication code contained in the ranging request message. Also, the TBS may transmit a ranging response message (e.g., RNG-RSP) including all adjustment values (e.g., time, power, available frequency correction values, etc.) which are needed for a TBS cell area by the MS at step S210.

By steps S201 to S210, a handover, a ranging, and an authentication between the MS and the TBS are completed, such that the MS and the TBS can perform a transmission/reception process of general data at step S211.

In case of supporting the optimized hard handover as shown in FIG. 2, the handover procedure can be completed by exchanging the ranging request and the response message between the MS and the TBS. Therefore, a service interruption time caused by a handover can be greatly reduced in the range from a transmission time of the handover indication (HO-IND) message to a reception time of the RNG-RSP message. Also, connection information including CID information may be pre-transferred to the MS at step S205, so that an amount of overhead caused by the ranging process can be greatly reduced.

Figure 3:
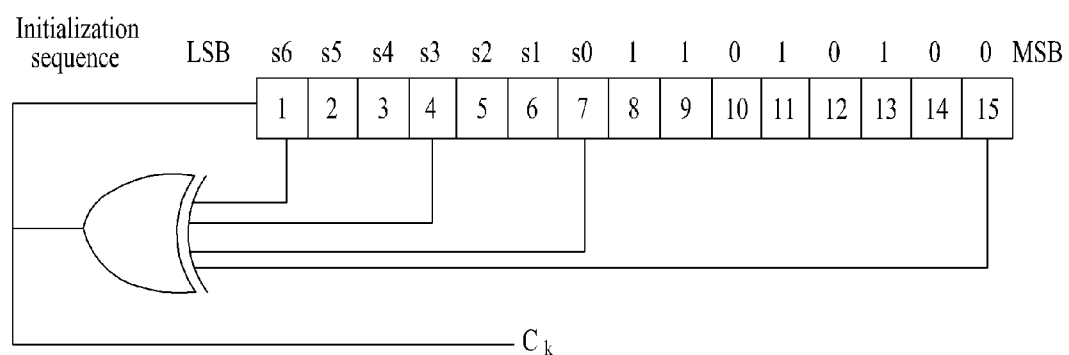
FIG. 3 illustrates a Pseudo Random Bit Sequence (PRBS) generator for generating an initial uplink sequence (e.g., a ranging code) transferred from a mobile station to a target base station (TBS) according to the present invention.

FIG. 3 illustrates a Pseudo Random Bit Sequence (PRBS) generator for generating an initial uplink sequence (e.g., a ranging code) transferred from a mobile station to a target base station (TB S) according to the present invention.

The PRBS generator can generate a ranging code. Generally, the PRBS generator S0~S6 values entered as seed data can be used as LSB 7 bits of a UL-Permbase parameter transferred from the TBS via an uplink channel identifier. An output bit-stream of the PRBS generator can generate 256 ranging codes, each of which has a length of 144 bits.

A polynomial of the PRBS generator of FIG. 3 is represented by the following equation 1:

Math FIG. 1

$$1+x^1+x^4+x^7+x^{15}$$ [Math.1]

The PRBS generator is initialized by b14 ... b0=0, 0, 1, 0, 1, 0, 1, 1, $s_0, s_1, s_2, s_3, s_4, s_5, s_6$. In this case, $s_6$ is an LSB of an initialization value, $s_6$:$s_0$ is 'UL_PermBase' (i.e., $s_6$:$s_0$=UL_PermBase). However, $s_6$ is an MSB value of the UL_PermBase. Input values applied to the PRBS generator are preferable values, and may be changed to others according to system requirements.

A binary ranging code is indicative of a pseudo random bit sequence (PRBS) subsequence of a pseudo-noise (PN) sequence contained in output data $C_k$, and the length of each ranging code is 144 bits. The PRBS generator modulates subcarriers of 6 neighboring subchannel groups (or 8 neighboring subchannel groups) using the above bits. In this case, if the subchannels have successive logical numbers, they may be considered to be neighboring subchannels.

Individual bits are mapped to subcarriers in the order of increasing a subcarrier frequency, such that bits indexed to least significant bits can modulate least significant physical index subcarriers and other bits indexed to most significant bits can modulate most significant physical index subcarriers. In this way, an index of a subchannel having a least significant number in 6 groups (or 8 groups) may be set to an integer multiple of 6 or 8. In this case, 6 or 8 subchannels may be called ranging subchannels.

The embodiments of the present invention may use a method for generating an uplink sequence using an authentication key (AK) as well as the general ranging code of FIG. 3. For example, the embodiments may use uplink sequences when the MS is registered in the TBS. That is, the MS uses either an authentication key (AK) or an LSB of a message authentication code (i.e., Cipher-based Message Authentication Code: CMAC) generated from the AK as a seed of the PRBS generator instead of 'UL_Permbase', such that it may generate an authenticated handover ranging code (i.e., an uplink sequence). In this case, the AK is generated when the MS is authenticated by an authentication server of a serving network.

Referring to FIG. 3, the PRBS generator may generate 256 ranging codes, each of which has a length of 144 bits. The MS may use the authenticated handover ranging code generated by either the AK or the CMAC of the serving base station (SBS), as an uplink sequence initially transferred to the TBS during a handover. The TBS receives an authenticated HO ranging code generated by the AK from the MS, such that the MS and the TBS can authenticate the MS of a handover state without transmitting/receiving a message for handover authentication.

The embodiment of FIG. 3 can be applied to various fields in various ways. The embodiment of FIG. 3 may be applied to the step S209 of FIG. 2, such that an authentication process between the MS and the TBS can be carried out in a ranging procedure. The concept of FIG. 3 may also be applied to FIG. 4.

Figure 4:
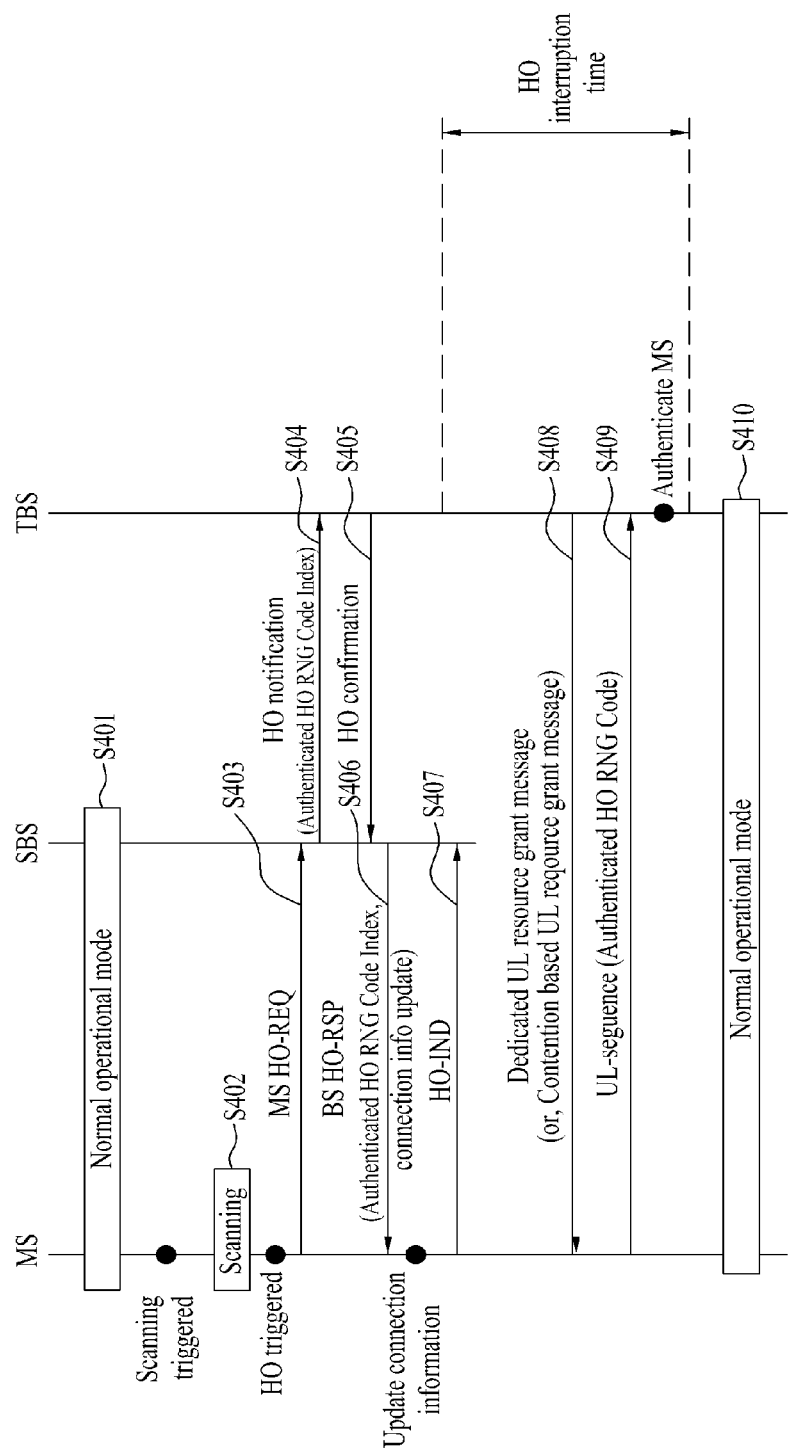
FIG. 4 is a flow chart illustrating a handover procedure according to another embodiment of the present invention.

FIG. 4 is a flow chart illustrating a handover procedure according to another embodiment of the present invention.

Referring to FIG. 4, the MS performs an authentication process using an AAA server such that it can be registered in the SBS. The AK of the MS can be shared between the MS and the SBS. The MS and the SBS may encrypt data using the AK, or may generate an encryption key and authentication code for message authentication. If the registration procedure between the MS and the SBS is completed, the MS can transmit and receive data to/from the SBS under a normal operational mode at step S401.

As the MS moves from one position to another position within a cell area of the SBS, a quality of a downlink signal received from the SBS may be gradually less than a predetermined level. In this case, the MS may perform a scanning process for measuring a channel quality of the neighboring base station. The MS may decide to perform a handover to the neighboring base station on the basis of neighboring base station's channel quality information acquired by the scanning process at step S402.

If the TBS to which the MS will be handed over is decided by the scanning result, the MS transmits a handover request message (e.g., MS HO-REQ) for the handover to the TBS to the SBS at step S403.

The SBS can transmit a HO notification message to the TBS at step S404, such that it may inform the TBS that the MS has requested a handover.

At step S404, the HO notification message may be transferred to the TBS over a backbone network. In this case, the SBS may include the number of transport CIDs (TCIDs) related to a service currently received from the SBS in the HO notification message, such that it may transmit the resultant HO notification message to the TBS. Also, the SBS may further include an authentication key related to the MS and an authenticated HO ranging code index to be transferred from the MS to the TBS in the HO notification message, such that it may transmit the resultant HO notification message including the AK and the authenticated HO ranging code index to the TBS.

At step S404, the TBS checks the number of transport CIDs (TCIDs) needed for the MS in the HO notification message, such that it may allocate the transport CID (TCID) used in a cell area of the TBS to the MS. Therefore, the TBS may include CID update information, which is capable of being allocated from a cell area of a current TBS to the MS, in the HO confirmation message.

In response to the HO notification message, the TBS may include connection information (CI) used by the TBS in the HO confirmation message, and may transmit the resultant HO confirmation message to the SBS at step S405.

At step S405, the connection information (CI) used by the TBS may further include connection identifier (CID) information. The CID information includes a basic CID (BCID), a primary CID (PCID), a transport CID (TCID) capable of being allocated to the MS, etc.

The steps S404 and S405 may be carried out over a backbone network between the SBS and the TBS. By the steps S404 and S405, the SBS and the TBS exchange MS information with each other, such that a method for preparing for a handover of the mobile station (MS) can be carried out.

The SBS can transmit a handover response message (e.g., a BS HO-RSP) to the MS. The handover response message may include information of an appropriate TBS to which the MS will be handed over, and may include an initial uplink access time related to the TBS. Also, the handover response message may further include connection information used in the TBS of the MS at step S406.

By the step S406, the MS may pre-update connection information used by the TBS before completing the handover to the TBS. Also, the SBS may include the authenticated HO ranging code index to be used for the MS accessing the TBS in the HO response message, such that it transmits the resultant HO response message.

At steps S404 and S406, the SBS may use a predetermined value as the authenticated HO ranging code index. In other words, the SBS may apply a predetermined authenticated HO ranging code index to the TBS and the MS, such that it may not transmit the authenticated HO ranging index via the HO message.

In this case, the SBS may inform the MS or the TBS of the predetermined authenticated HO ranging code index via an uplink channel descriptor (UCD) message or an NBR-ADV message. In this case, the UCD message may be periodically broadcast.

Referring to FIG. 4, the MS finally informs the SBS of a handover to the TBS using the HO-IND message, and completes a connection to the SBS at step S407.

In order to allocate uplink resources, the TBS transmits a dedicated UL resource grant message or a Contention-based UL resource grant message to the MS at step S408.

At step S408, the dedicated UL resource grant message may include a fast ranging IE. Also, the contention-based UL resource grant message may be configured in the form of a UL-MAP (UIUC 12), and may then be transferred.

The MS may establish downlink synchronization with the TBS at step S408. Also, the MS may generate an uplink sequence (e.g., an authenticated HO ranging code) using an AK generated when the MS is registered in the SBS. A method for generating the uplink sequence may correspond to the method of FIG. 3. That is, the MS may use the AK, generated while being registered in the SBS, as a seed, such that it may generate the uplink sequence initially transferred to the TBS.

The MS can transmit the uplink sequence (e.g., authenticated HO ranging code) generated by the AK to the TBS. In this case, at step S409, the MS may transmit the uplink sequence to the TBS via uplink resources which have been allocated at the above step S408.

As shown in the above step S409, the support or non-support of the authenticated HO ranging code based on the AK can be recognized by a basic capability negotiation procedure and/or a handover message of a handover procedure. In this case, the basic capability negotiation procedure is carried out when the MS is initially registered in the SBS. Also, the SBS includes specific information indicating the support or non-support of the authenticated HO ranging code generated by the AK in the BS HO-RSP message, such that it may inform each MS of the specific information. Also, the SBS may inform each MS of the support or non-support of the authenticated HO ranging code via either a downlink channel descriptor (DCD) periodically broadcast to the MS or the NBR-ADV message broadcasting neighboring base station information.

If the TBS receives the uplink sequence (i.e., authenticated HO RNG code) from the MS at step S409, it can confirm that the MS has been handed over. Therefore, the TBS may allocate uplink resources in order to allow the MS to transmit data to the TBS, or may transmit downlink data, such that it can perform normal operations at step S410.

At step S410, the MS may receive uplink resources from the base station after transmitting the uplink sequence or may receive downlink data, such that it can confirm that the handover has been completed.

At step S410, in order to provide the MS with TBS authentication information, the TBS may add a message authentication code needed for BS authentication to downlink data, a ranging response message or other downlink control messages, and may transmit the added result. If the MS receives downlink traffic including the message authentication code from the base station, it performs message authentication, such that it can be recognized whether or not the TBS and the MS have the same AK.

In this case, downlink data may be combined with a security association having a data encryption function and a data authentication function. In this case, the MS performs data authentication, such that mutual authentication between the MS and the TBS can be carried out. Also, the mutual authentication for the TBS by the ranging response message may be carried out by a message authentication code (i.e., Cipher-based Message Authentication Code: CMAC) contained in the ranging response message. In this case, the ranging response message may include not only a ranging parameter adjustment value for uplink sequence transmission of the MS but also ranging status information. Also, the ranging response message may be transferred along with downlink data. Besides, authentication based on other downlink messages may be provided via a new message (i.e., downlink signaling header and subheader) including the message authentication code, such that the MS may also authenticate the TBS.

As shown in FIG. 4, if a system supports the optimized hard handover (i.e., optimized HardOver), the MS transmits an initial transmission uplink sequence to the TBS in order to complete a handover procedure. Therefore, the MS can greatly reduce a service interruption time caused by the handover, wherein the reduced service interruption time ranges from one time at which the MS transmits the HO-IND message to the SBS to another time at which the MS transmits the initial uplink sequence to the TBS and is then authenticated by the TBS. Also, the connection information (CI) including the CID and others is pre-transferred to the MS, such that an amount of overhead caused by the handover can be further reduced.

Figure 5:
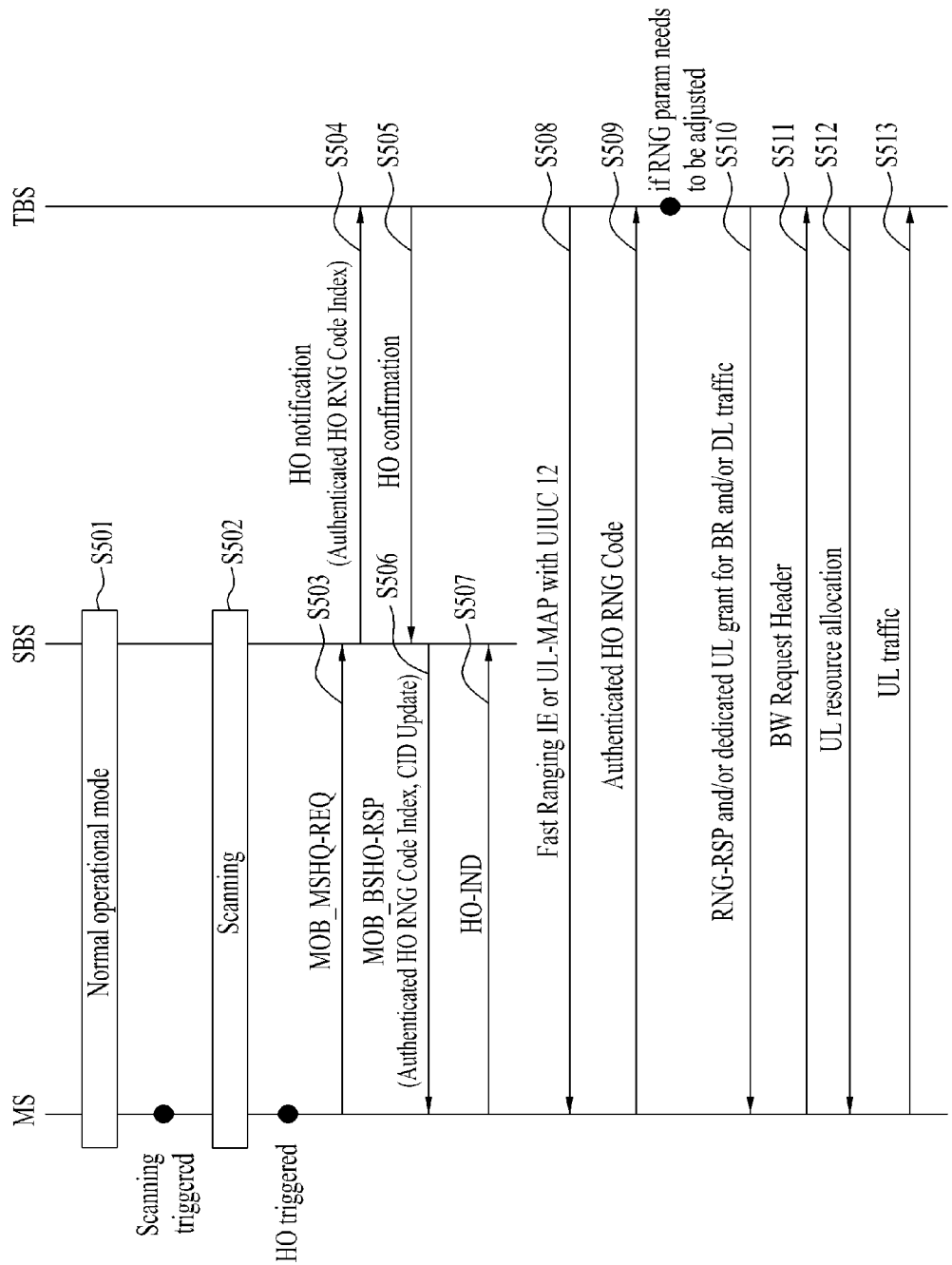
FIG. 5 is a flow chart illustrating a handover procedure including a specific method which enables a target base station to transmit a ranging response message to a mobile station in order to adjust a ranging parameter according to still another embodiment of the present invention.

FIG. 5 is a flow chart illustrating a handover procedure including a specific method which enables the TBS to transmit a ranging response message to the MS in order to adjust a ranging parameter according to still another embodiment of the present invention.

Referring to FIG. 5, steps S501~S507 are similar to steps of S401~S407 of FIG. 4.

However, at step S506, the SBS may transmit CID update information as connection information (CI) to the MS.

After performing the step S507, the TBS may transfer a fast ranging IE message or an 'UL-MAP with UIUC 12' message to the MS in order to allocate uplink resources to the MS at step S508.

The MS can establish downlink synchronization with the TBS at step S508. Also, the MS may transfer an initial uplink sequence (e.g., authenticated HO RNG Code) to the TBS via uplink resources allocated from the TBS. Preferably, the initial uplink sequence may be determined to be the uplink sequence of FIG. 3. That is, the MS may use the AK, generated while being registered in the SBS, as a seed, such that it may generate the authenticated HO RNG code. Therefore, the MS may transfer the authenticated HO RNG code to the TBS at step S509.

Upon receiving the authenticated HO RNG code from the MS, the TBS may transmit a ranging response message (i.e., RNG-RSP message), dedicated UL grant message, and/or DL traffic to the MS in response to the authenticated HO RNG code. If there is a need to adjust the ranging parameter according to a communication environment or user requirement, the TBS may transfer an adjusted ranging parameter to the MS using the RNG-RSP message at step S510.

At step S510, the TBS may allocate uplink resources in order to allow the MS to transmit an uplink resource request header (i.e., RW Request Header). In this case, if there is downlink data to be transferred from the TBS to the MS, the TBS may transmit the RNG-RSP message and downlink data to the MS.

The MS may transfer a bandwidth request header to the TBS using uplink resources allocated from the TBS at step S511.

In response to the above step S511, the TBS may allocate an uplink bandwidth using the UL resource allocation message at step S512.

At step S513, the MS may transmit uplink traffic to the TBS via the allocated bandwidth of the above step S512.

In FIG. 5, the TBS may allocate a fast feedback channel (for example, CQICH) to the MS in order to report a downlink channel quality of the MS. The MS to which the fast feedback channel (CQICH) has been allocated transmits downlink channel quality information to the TBS, and the TBS properly selects a modulation and channel coding scheme (MCS) via the downlink channel quality information, and transmits downlink data to the MS according to the selected MCS.

Figure 6:
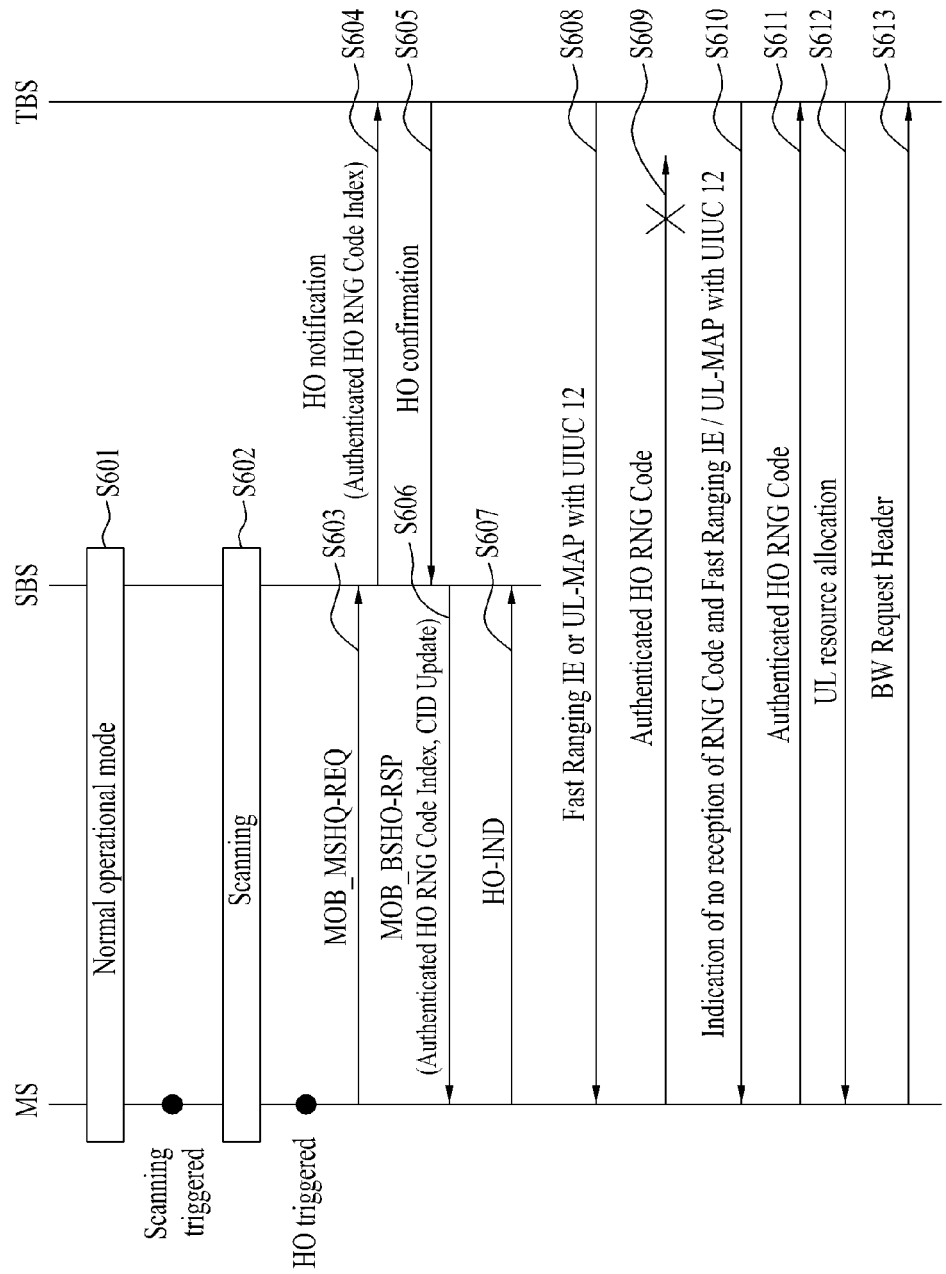
FIG. 6 is a flow chart illustrating a method for allowing a mobile station to retransmit an initial uplink sequence (i.e., an authenticated handover ranging code) to a target base station according to still another embodiment of the present invention.

FIG. 6 is a flow chart illustrating a method for allowing the MS to retransmit an initial uplink sequence (i.e., an authenticated handover ranging code) to the TBS according to still another embodiment of the present invention.

Referring to FIG. 6, steps S601~S609 are similar to steps of S401~S409 of FIG. 4. In order to prevent repetition of the same explanation, the steps S601~S609 of FIG. 6 will refer to the steps S401~S409 of FIG. 4 as necessary.

However, at step S609, although the MS has transmitted the authenticated HO RNG code to the TBS, the RNG code is lost by wire or wirelessly.

The TBS informs the MS of non-reception of the ranging code (i.e., uplink sequence), such that it may command the MS to retransmit the authenticated HO RNG code. That is, in order to inform the MS of the loss of the authenticated HO RNG code, the TBS may transfer the fast ranging IE message or the UL-MAP message with UIUC 12 to the MS at step S610.

The MS may retransmit the uplink sequence (e.g., authenticated HO RNG code) to the TBS via uplink resources allocated from the TBS. Preferably, the uplink sequence may be determined to be the uplink sequence of FIG. 3. That is, the MS may use the AK, generated while being registered in the SBS, as a seed, such that it may regenerate the authenticated HO RNG code. Therefore, the MS may transfer the regenerated authenticated HO RNG code to the TBS at step S611.

In this case, allocation of dedicated uplink resources used for receiving the authenticated HO RNG code from the MS may be repeatedly carried out within a pre-determined time. If the MS receives uplink resources for transmitting another authenticated HO RNG code from the base station after transmitting the initial authenticated HO RNG code, the MS may retransmit the authenticated HO RNG code.

Also, if the SBS receives information of the last TBS via the HO-IND message from the MS and informs the TBS of the received information, the TBS may reallocate uplink resources dedicated for the authenticated HO RNG code.

In order to allocate uplink resources to the MS, the TBS can transmit the UL resource allocation message to the MS at step S612.

The MS may transmit the bandwidth request header to the TBS via the allocated uplink resources at step S613.

By the above-mentioned steps, the MS can be quickly handed over to the TBS. That is, in the case where the TBS does not receive the authenticated HO RNG code from the MS although the MS has transmitted the authenticated HO RNG code to the TBS, the TBS may inform the MS of the non-reception of the authenticated HO RNG code. Therefore, the MS retransmits the HO RNG code such that the TBS can allocate uplink resources to the MS, or the MS transmits downlink data such that the handover can be completed.

Figure 7:
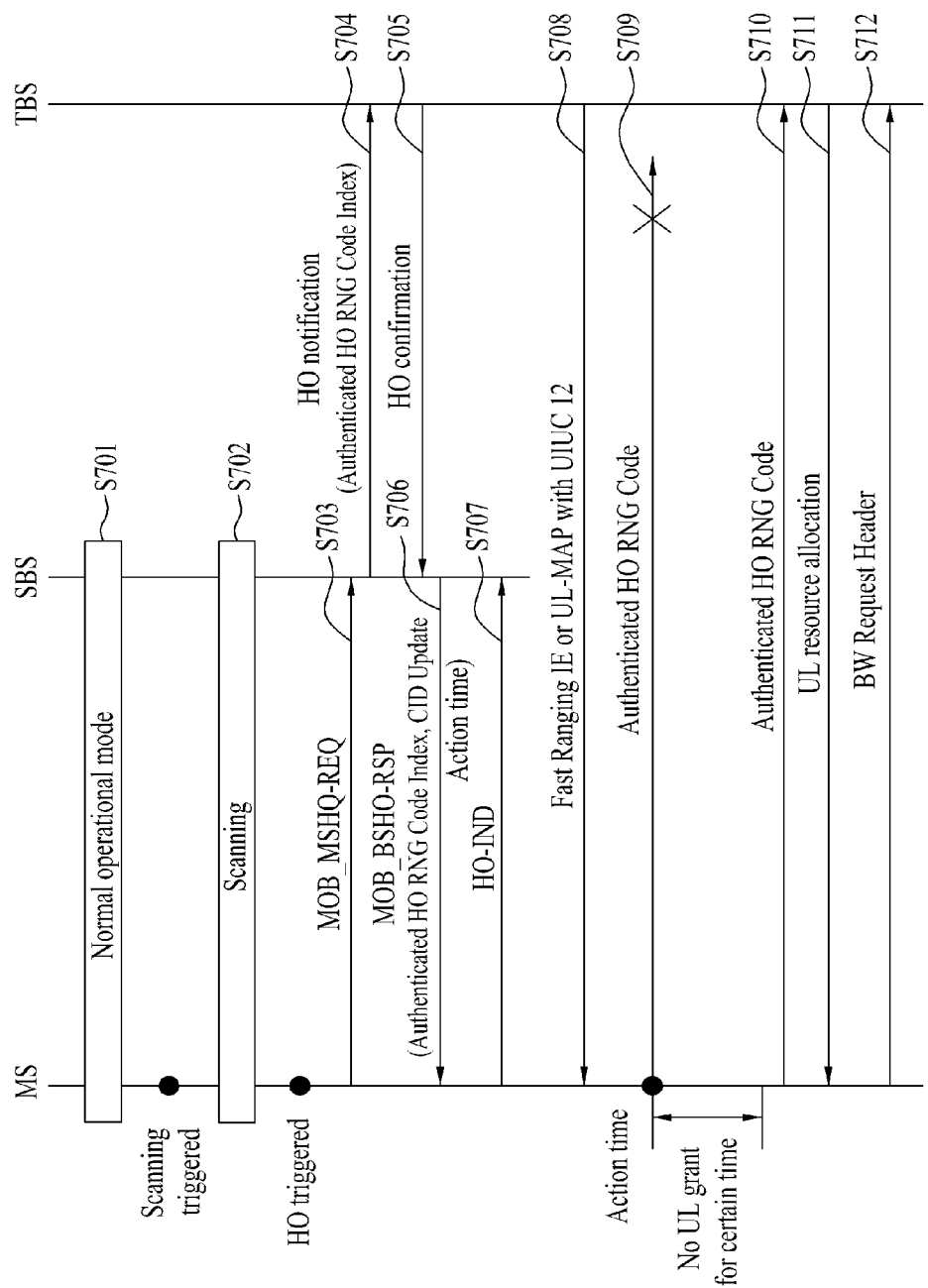
FIG. 7 is a flow chart illustrating a method for allowing a mobile station to retransmit an initial uplink sequence (i.e., an authenticated handover ranging code) to a target base station according to still another embodiment of the present invention.

FIG. 7 is a flow chart illustrating a method for allowing the MS to retransmit an initial uplink sequence (i.e., an authenticated handover ranging code) to the TBS according to still another embodiment of the present invention.

Referring to FIG. 7, steps S701~S709 are similar to steps of S401~S409 of FIG. 4. In order to prevent repetition of the same explanation, the steps S701~S709 of FIG. 7 will refer to the steps S401~S409 of FIG. 4 as necessary. However, at step S706, it is assumed that the SBS further includes information of an action time indicating a handover action time related to the TBS in a handover response message (i.e., MOB_BSHO-RSP) such that the resultant handover response message (MOB_BSHO-RSP) including the action time information may be transferred to the MS.

Referring to FIG. 7, at step S709, the authenticated HO RNG code transferred from the MS to the TBS is lost by wire or wirelessly.

After the MS transmits the authenticated HO RNG code, it may not receive a response from the TBS within a predetermined time. In this case, the MS may set this predetermined time to an action time received from the SBS at step S706. Since the MS does not receive upink resources from the TBS during the action time, the MS can retransmit the authenticated HO RNG code to the TBS at step S710.

In order to allocate uplink resources to the MS, the TBS can transmit the UL resource allocation message to the MS at step S711.

The MS may transmit the bandwidth (BW) request header to the TBS via the allocated uplink resources at step S712.

In case of using the method of FIG. 7, although the MS, which has transmitted the authenticated HO RNG code to the TBS, receives no response from the TBS during a predetermined time, the MS retransmits the authenticated HO RNG code, resulting in the implementation of a rapid handover.

Figure 8:
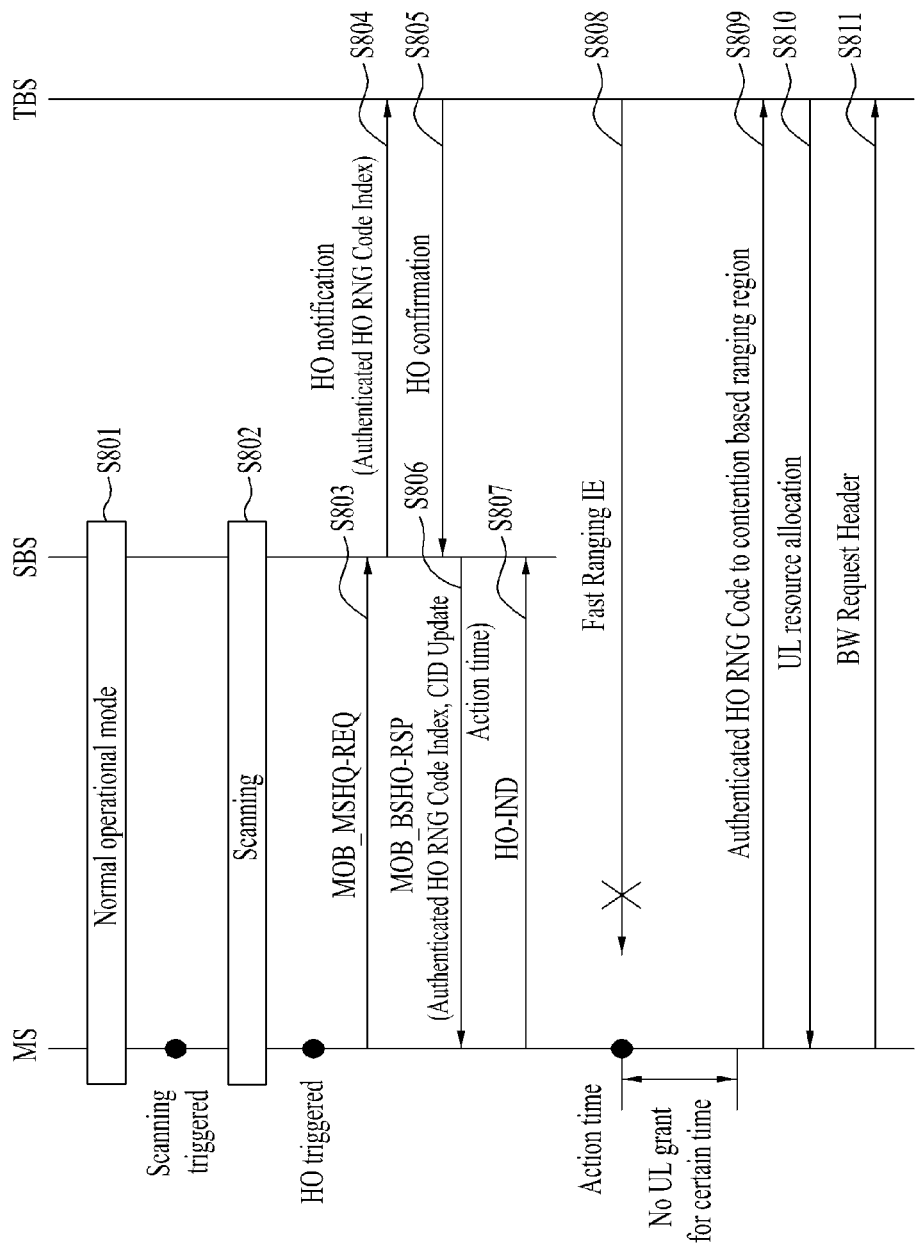
FIG. 8 is a flow chart illustrating a method for performing a rapid handover according to still another embodiment of the present invention.

FIG. 8 is a flow chart illustrating a method for performing a rapid handover according to still another embodiment of the present invention.

Referring to FIG. 8, steps S801~S807 are similar to steps of S401~S407 of FIG. 4. In order to prevent repetition of the same explanation, the steps S801~S807 of FIG. 8 will refer to the steps S401~S407 of FIG. 4 as necessary. However, at step S806, it is assumed that the SBS further includes information of an action time in a handover response message (i.e., MOB_BSHO-RSP) such that the resultant handover response message (MOB_BSHO-RSP) including the action time information may be transferred to the MS.

Referring to FIG. 8, in order to allocate dedicated uplink resources to the MS to be handed over, the TBS transmits a message including the fast ranging IE to the MS. However, the message including the fast ranging IE may be lost by wire or wirelessly. Therefore, although a current time reaches the action time, the MS is unable to receive uplink resources from the TBS during a predetermined time at step S808.

The MS must retransmit the authenticated HO RNG code to the TBS. However, the MS may transmit the authenticated HO RNG code to the TBS via a contention-based ranging area at step S809.

In order to allocate uplink resources to the MS, the TBS can transmit the UL resource allocation message to the MS at step S810.

The MS may transmit the bandwidth (BW) request header to the TBS via the allocated uplink resources at step S811.

Figure 9:
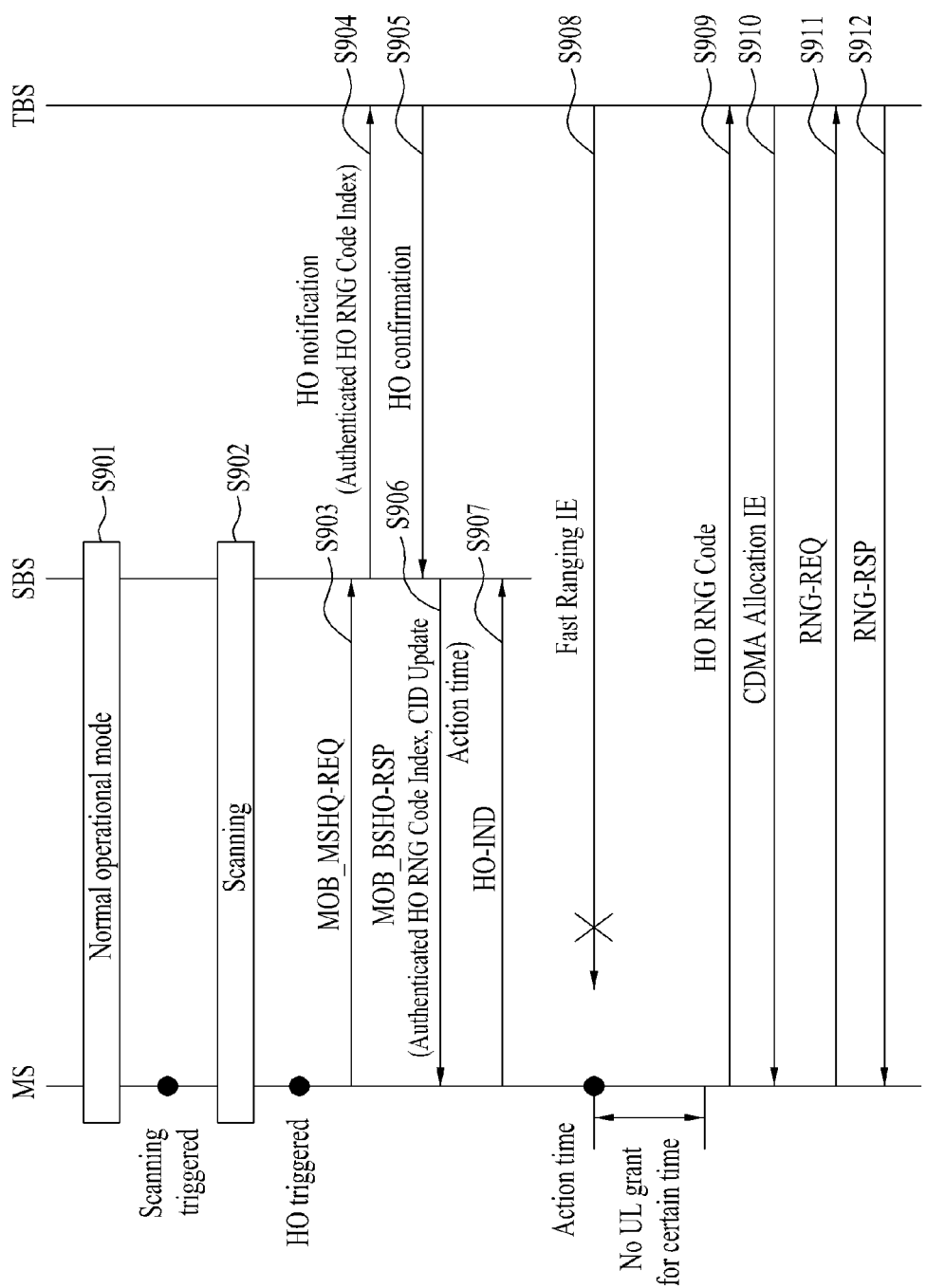
FIG. 9 is a flow chart illustrating a method for performing a rapid handover according to still another embodiment of the present invention.

FIG. 9 is a flow chart illustrating a method for performing a rapid handover according to still another embodiment of the present invention.

Referring to FIG. 9, steps S901~S907 are similar to steps of S401~S407 of FIG. 4. In order to prevent repetition of the same explanation, the steps S901~S907 of FIG. 9 will refer to the steps S401~S407 of FIG. 4 as necessary. However, at step S906, it is assumed that the SBS further includes information of an action time in a handover response message (i.e., MOB_BSHO-RSP) such that the resultant handover response message (MOB_BSHO-RSP) including the action time information may be transferred to the MS.

Referring to FIG. 9, in order to allocate dedicated uplink resources to the MS to be handed over, the TBS transmits a message including the fast ranging IE to the MS. However, the message including the fast ranging IE may be lost by wire or wirelessly. Therefore, although a current time reaches the action time, the MS is unable to receive uplink resources from the TBS during a predetermined time at step S908.

In order to perform a handover between the MS and the TBS, the MS may transmit a general HO RNG code to the TBS at step S909.

The TBS may transmit a message including a CDMA allocation IE message to the MS in response to the general HO RNG code at step S910.

The MS transmits the ranging request message (RNG-REQ) to the TBS using uplink resources allocated from the TBS at step S911. The TBS transmits a ranging response message (RNG-RSP) to the MS, such that a handover process can be carried out at step S912.

Figure 10:
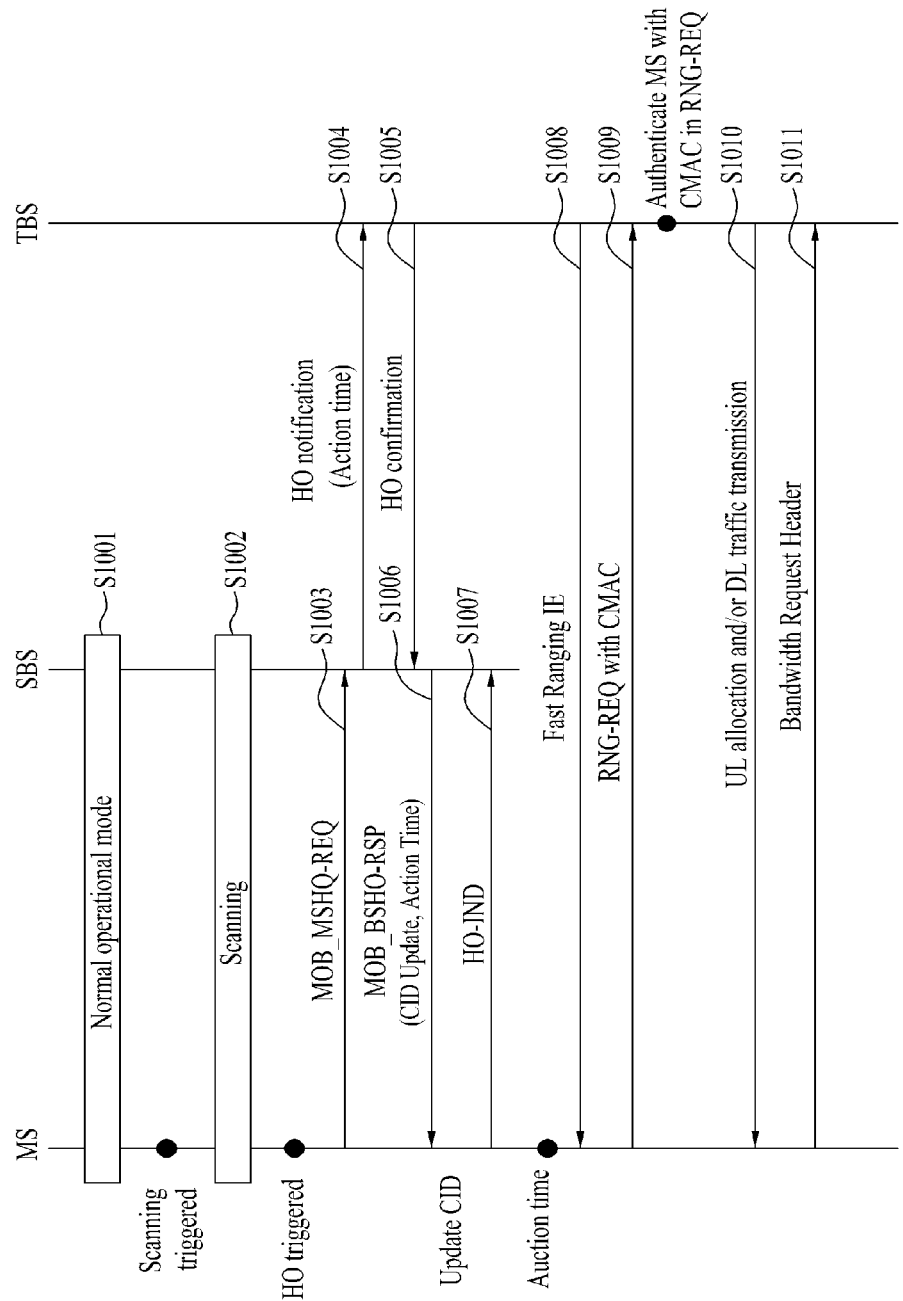
FIG. 10 is a flow chart illustrating a method for performing a rapid handover according to still another embodiment of the present invention.

FIG. 10 is a flow chart illustrating a method for performing a rapid handover according to still another embodiment of the present invention.

Referring to FIG. 10, the MS performs an authentication process via an AAA server such that the MS can be registered in the SBS. In this case, The AK of the MS can be shared between the MS and the SBS. The MS and the SBS may encrypt data using the AK, or may generate an encryption key and authentication code for message authentication. If the registration procedure between the MS and the SBS is completed, the MS can transmit and receive data to/from the SBS under a normal operational mode at step S1001.

As the MS moves from one position to another position within a cell area of the SBS, a quality of a downlink signal received from the SBS may be gradually less than a predetermined level, as denoted by 'Scanning triggered'. In this case, the MS may perform a scanning process for measuring a channel quality of the neighboring base station. The MS may decide to perform a handover to the neighboring base station on the basis of neighboring base station's channel quality information acquired by the scanning process at step S1002, as denoted by 'HO triggered'.

If the TBS to which the MS will be handed over is decided by the scanning result, the MS transmits a handover request message (e.g., MS HO-REQ) for the handover to the TBS to the SBS at step S1003.

The SBS can transmit a HO notification message to the TBS at step S1004, such that it may inform the TBS that the MS has requested a handover.

At step S1004, the HO notification message may be transferred to the TBS over a backbone network. In this case, the SBS may include information of transport CIDs (TCIDs) related to a service currently received from the SBS in the HO notification message, such that it may transmit the resultant HO notification message to the TBS. The SBS may further include an authentication key (AK) related to the MS in the HO notification message, such that it may transmit the resultant HO notification message including the AK to the TBS. Also, the SBS may further include information of an action time at which the MS will perform a handover in the HO notification message, such that it may transmit the resultant HO notification message including the action time information to the TBS.

At step S1004, the TBS checks the number of transport CIDs (TCIDs) needed for the MS in the HO notification message, such that it may allocate the transport CID (TCID) used in a cell area of the TBS to the MS.

In response to the HO notification message, the TBS may include connection information (CI) used by the TBS in the HO confirmation message, and may transmit the resultant HO confirmation message to the SBS at step S1005.

At step S1005, the connection information (CI) used by the TBS may further include connection identifier (CID) information. The CID information may include a basic CID (BCID), a primary CID (PCID), a transport CID (TCID), etc., wherein the BCID, the PCID, and the TCID are used by the TBS. In this case, the number of TCIDs is determined by the number of MS TCIDs which has been received at step S1004.

At steps S1004 and S1005, the exchange between the HO notification message and the HO confirmation message may be carried out over a backbone network between the SBS and the TBS. By the steps S1004 and S1005, the SBS and the TBS exchange MS information with each other, such that a method for preparing for a handover of the MS can be carried out.

The SBS can transmit a handover response message (e.g., MOB_BSHO-RSP) to the MS. The handover response message (MOB_BSHO-RSP) may include information of an appropriate TBS to which the MS will be handed over, and may include an initial uplink access time (e.g. Action Time) related to the TBS. Also, the handover response message may further include connection information (CI) used in the TBS of the MS at step S1006.

By the step S1006, the MS may pre-update connection information (CI) used by the TBS before completing the handover to the TBS.

The MS finally informs the SBS of the handover to the TBS using the handover notification message (e.g., HO-IND), and completes a connection to the SBS at step S1007.

In order to allocate uplink resources to the MS, the TBS may transmit a dedicated UL resource grant message (e.g., Fast Ranging IE) to the MS at step S1008.

The MS may transmit a ranging request message (RNG-REQ) including a message authenticated code (CMAC) to the TBS at step S1009.

If the TBS receives the RNG-REQ message from the MS, it may authenticate the MS by authenticating the RNG-REQ message. At step S1010, if the MS authentication is completed, the TBS allocates uplink resources to the MS (i.e., UL allocation) such that the MS can transmit data to the TBS, or the TBS transmits downlink data to the MS (i.e., traffic transmission) such that normal operations can be carried out.

In this case, after the MS transmits the RNG-REQ message, it may receive uplink resources from the base station or may receive downlink data (i.e., DL traffic) from the base station, such that it can be recognized that the handover has been normally completed. According to not only the presence or absence of data to be transmitted via allocated uplink resources but also the amount of such data, the MS may request uplink resources from the TBS using an uplink bandwidth request header or may transmit uplink data to the TBS using the same uplink bandwidth request header. Also, the MS can receive downlink data from the TBS at step S1011.

According to another embodiment of FIG. 10, the MS transmits the RNG-REQ message to the TBS during a handover, such that the TBS may authenticate the MS. Also, the TBS can be directly shifted to another status in which the TBS communicates with the MS, without transmitting the RNG-REQ message.

Figure 11:
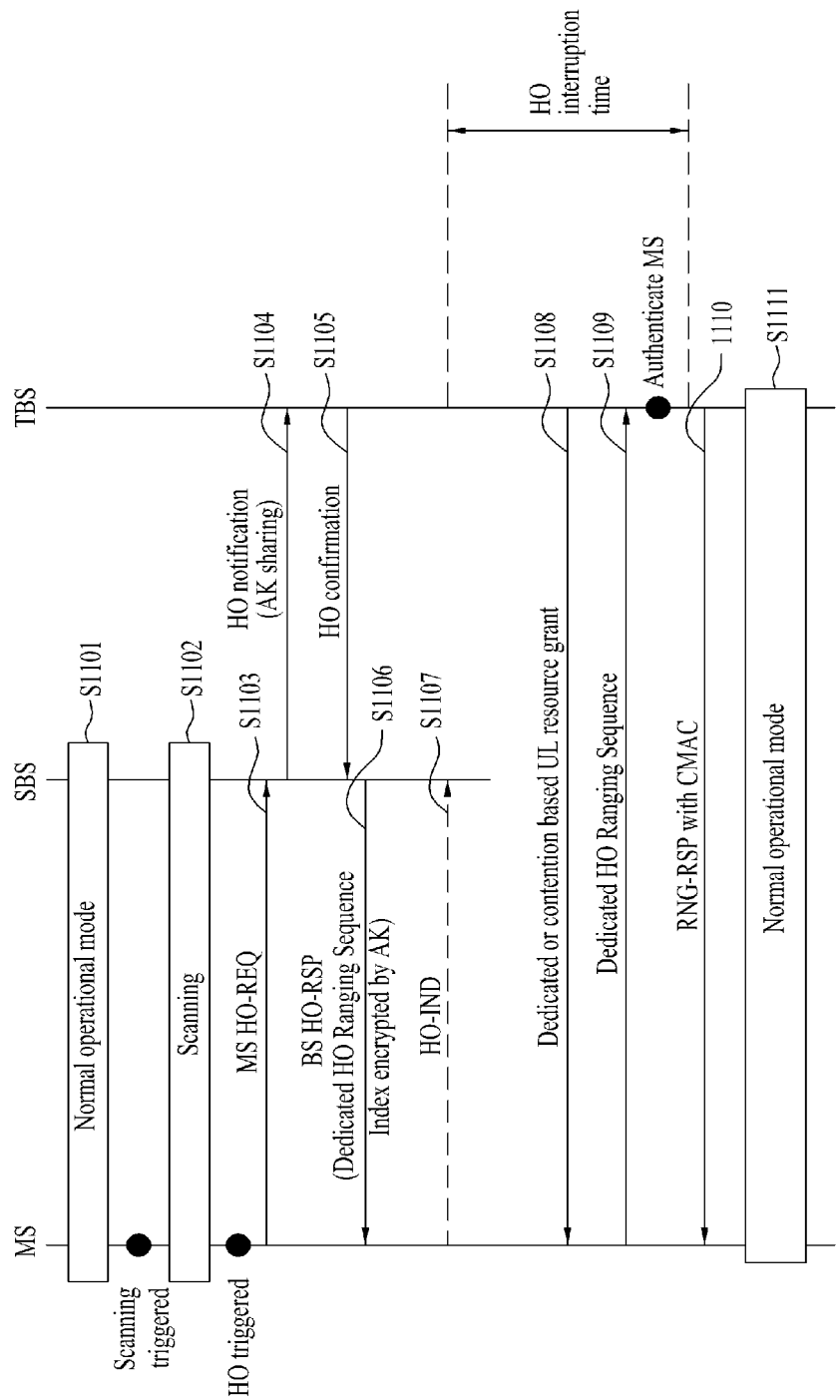
FIG. 11 is a flow chart illustrating a method for performing a rapid handover according to still another embodiment of the present invention.

FIG. 11 is a flow chart illustrating a method for performing a rapid handover according to still another embodiment of the present invention.

Referring to FIG. 11, the MS performs an authentication process via an AAA server such that the MS can be registered in the SBS. The AK of the MS can be shared between the MS and the SBS. The MS and the SBS may encrypt data using the AK, or may generate an encryption key and authentication code for message authentication. If the registration procedure between the MS and the SBS is completed, the MS can transmit and receive data to/from the SBS under a normal operational mode at step S1101.

As the MS moves from one position to another position within a cell area of the SBS, a quality of a downlink signal received from the SBS may be gradually less than a predetermined level, as denoted by 'Scanning triggered'. In this case, the MS may perform a scanning process for measuring a channel quality of the neighboring base station. The MS may decide to perform a handover to the neighboring base station on the basis of neighboring base station's channel quality information acquired by the scanning process at step S1102, as denoted by 'HO triggered'.

If the TBS to which the MS will be handed over is decided by the scanning result, the MS transmits a handover request message (e.g., MS HO-REQ) for the handover to the TBS to the SBS at step S1103.

The SBS can transmit a HO notification message to the TBS at step S1104, such that it may inform the TBS that the MS has requested a handover.

At step S1104, the HO notification message may be transferred to the TBS over a backbone network. In this case, the HO notification message may include at least one of a transmission flow ID related to a service currently received from the SBS, an MS-associated authentication key (AK), and an action time for enabling the MS to perform a handover.

The TBS checks the number of TFIDs needed for the MS at step S1104, such that it may allocate the TFID used in a cell area of the TBS to the MS. The TFID may be mapped to the TCID.

In response to the HO notification message, the TBS may include connection information (CI) used by the TBS in the HO confirmation message, and may transmit the resultant HO confirmation message to the SBS at step S1105.

At step S1105, the connection information (CI) used by the TBS may further include a mobile station ID (MSID) and a transmission flow identifier (TFID). In this case, TFID information is determined by the number of MS TFIDs received at step S1104.

At steps S1104 and S1105, the exchange between the HO notification message and the HO confirmation message may be carried out over a backbone network between the SBS and the TBS. By the steps S1104 and S1105, the SBS and the TBS exchange MS information with each other, such that a method for preparing for a handover of the MS can be carried out.

In response to the MS HO-REQ message, the SBS can transmit a handover response message (e.g., BS HO-RSP) to the MS. The handover response message (MS HO-RSP) may include information (e.g., connection information) of an appropriate TBS to which the MS will be handed over. Also, the HO-RSP message may include a MS-dedicated HO ranging sequence used by the TBS.

In this case, the SBS may represent the UL ranging sequence dedicated for the handover in the form of an index format. Also, the SBS may encrypt the dedicated HO ranging sequence index into a mobile station authentication key (MS AK) and a CMAC key count, such that the encrypted result may be transferred to the MS at step S1106.

At step S1106, the dedicated HO ranging sequence index transferred from the SBS to the MS may be called a dedicated code index (DCI). The DCI may be encrypted by the following process.

At step S1106, characteristics of a function (f) for generating 'DCI(M)' encrypted by the AK and the CMAC key count are as follows.

For example, if $M_1$ is denoted by 'f($AK_1$, CMAC-Key $count_1$, $DCI_1$)' (i.e., $M_1$=f(AK, CMAC-Key $count_1$, $DCI_1$)) and $DCI_1$ is denoted by '$f^{-1}$($AK_1$, CMAC-Key $count_1$, $M_1$)' (i.e., $DCI_1$=$f^{-1}$($AK_1$, CMAC-Key $count_1$, $M_1$)), it is assumed that $M_2$ is 'f($AK_2$, CMAC-Key $count_2$, $DCI_2$)' (i.e., $M_2$=f($AK_2$, CMAC-Key $count_2$, $DCI_2$)) and $DCI_2$ is '$f^{-1}$($AK_2$, CMAC-Key $count_2$, $M_2$)' (i.e., $DCI_2$=$f^{-1}$($AK_2$, CMAC-Key $count_2$, $M_2$)). In this case, provided that $DCI_3$ is '$f^{-1}$($AK_3$, CMAC-Key $count_3$, $M_1$)' (i.e., $DCI_3$=$f^{-1}$($AK_3$, CMAC-Key $count_3$, $M_1$)) and $AK_1$ is different from $AK_3$, $DCI_1$ and $DCI_3$ must have different values under all kinds of cases.

In this case, the CMAC key count is commonly applied to the MS, such that the CMAC key count is omitted from the 'f' function. In this case, the encrypted M may be encrypted by f($AK_1$, $DCI_1$), such that the encrypted result is transmitted. Under the condition that a specific cell includes N number of DCIs for a defined handover (i.e., $DCI_n$(n=1, ... ,N)), X is $f^{-1}$($AK_m$, $M_1$)(i.e., X=$f^{-1}$($AK_m$, $M_1$)), $AK_1$! is $AK_m$ (i.e., $AK_1$!=$AK_m$), and $$X \notin \{DCI_n | n=1, \ldots, N\}$$

is satisfied, this condition guarantees a HO failure of another MS which is being handed over, such that the above-mentioned condition is needed.

At step S1106, the MS may pre-update CID information used by the TBS before completing a handover to the TBS.

The MS may finally inform the SBS of the handover to the TBS using the HO notification message (e.g., HO-IND), and may complete a connection to the SBS at step S1107.

The TBS may transmit the UL resource grant message to the MS so as to allow the MS to transmit the HO ranging sequence at step S1108.

The MS transmits a HO ranging sequence corresponding to the encrypted HO ranging sequence index received from the SBS to the TBS at step S1109.

At step S1109, the TBS receives the HO ranging sequence from the MS, such that it is able to authenticate the MS.

The TBS, which has received the dedicated HO ranging sequence from the MS, transmits a ranging response message (i.e., RNG-RSP) including the CMAC to the MS at step S1110.

If the MS authentication is completed, the TBS allocates uplink resources to the MS (i.e., UL allocation) such that the MS can transmit data to the TBS, or the TBS transmits downlink data to the MS (i.e., DL traffic transmission) such that normal operations can be carried out at step S1111.

In this case, after the MS transmits the RNG-REQ message, it may receive uplink resources from the base station or may receive downlink data from the base station, such that it can be recognized that the handover has been normally completed. According to not only the presence or absence of data to be transmitted via allocated uplink resources but also the amount of such data, the MS may request uplink resources via an uplink bandwidth request header or may transmit uplink data via the same uplink bandwidth request header. Also, the MS can receive downlink data from the TBS.

Figure 12:
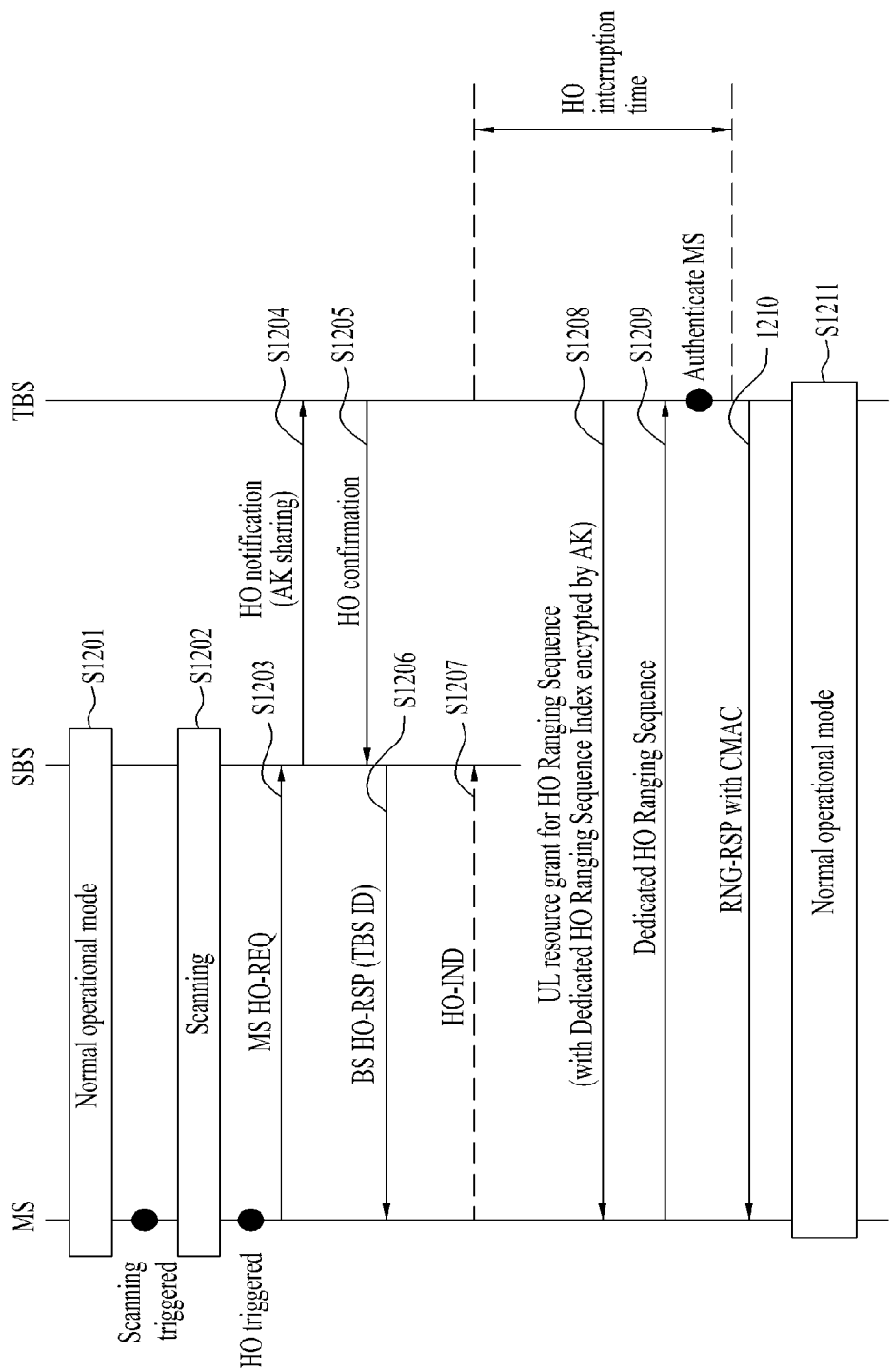
FIG. 12 is a flow chart illustrating a method for performing a rapid handover according to still another embodiment of the present invention.

FIG. 12 is a flow chart illustrating a method for performing a rapid handover according to still another embodiment of the present invention.

Referring to FIG. 12, steps S1201~S1205 are similar to steps of S1101~S1105 of FIG. 11. In order to prevent repetition of the same explanation, the steps S1201~S1205 of FIG. 12 will refer to the steps S1101~S1105 of FIG. 11 as necessary. However, at step S1205, the connection information (CI) used by the TBS may further include a mobile station ID (MSID) and a transmission flow identifier (TFID). In this case, TFID information is determined by the number of MS TFIDs received at step S1204.

At steps S1204 and S1205, the exchange between the HO notification message and the HO confirmation message may be carried out over a backbone network between the SBS and the TBS. By the steps S1204 and S1205, the SBS and the TBS exchange MS information with each other, such that a process for preparing for a handover of the MS can be carried out.

The SBS may transmit a handover response message (e.g., MOB_BSHO-RSP) to the MS. The handover response message (MOB_BSHO-RSP) may include information (e.g., TBS ID) of an appropriate TBS to which the MS will be handed over at step S1206.

At step S1206, the MS may update CID information used by the TBS before completing a handover to the TBS.

The MS may finally inform the SBS of the handover to the TBS using the HO notification message (e.g., HO-IND), and may complete a connection to the SBS at step S1207.

The TBS may transmit a UL resource grant message for allocating uplink resources to the MS, such that the MS can transmit the dedicated HO Ranging Sequence. In this case, the UL resource grant message may include a dedicated HO ranging sequence index encrypted by AK at step S1208.

A method for encrypting the dedicated HO ranging sequence index at step S1208 of FIG. 12 is equal to that of the step S1106 of FIG. 11.

The MS may transmit the dedicated HO ranging sequence corresponding to the encrypted HO ranging sequence index received from the TBS to the TBS at step S1209.

At step S1209, the TBS receives the dedicated HO ranging sequence from the MS, such that it is able to authenticate the MS.

The TBS, which has received the dedicated HO ranging sequence from the MS, transmits a ranging response message (i.e., RNG-RSP) with the CMAC to the MS at step S1210.

If the MS authentication is completed, the TBS allocates uplink resources to the MS (i.e., UL allocation) such that the MS can transmit data to the TBS, or the TBS transmits downlink data to the MS (i.e., DL traffic transmission) such that normal operations can be carried out at step S1211.

In this case, after the MS transmits the RNG-REQ message, it may receive uplink resources from the base station or may receive downlink data from the base station, such that it can be recognized that the handover has been normally completed. According to not only the presence or absence of data to be transmitted via allocated uplink resources but also the amount of such data, the MS may request uplink resources via an uplink bandwidth request header or may transmit uplink data via the same uplink bandwidth request header. Also, the MS can receive downlink data from the TBS.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Therefore, the above-mentioned detailed description must be considered for only illustrative purposes instead of restrictive purposes. The scope of the present invention must be decided by a rational analysis of claims, and all modifications within equivalent ranges of the present invention are contained in the scope of the present invention. It is obvious to those skilled in the art that claims having no explicit citation relationships are combined with each other to implement the embodiments, or new claims obtained by the amendment after the patent application may also be contained in the present invention without departing from the scope and spirit of the present invention.

Industrial Applicability

As apparent from the above description, the embodiments of the present invention can be applied to a variety of wireless access systems, for example, a 3rd Generation Partnership Project (3GPP), a 3GPP2, and/or an IEEE 802.xx (Institute of Electrical and Electronic Engineers 802) system. The embodiments of the present invention can be applied to not only the various wireless access systems but also all the technical fields acquired by the application of these wireless access systems.

The invention claimed is:

1. A method for quickly performing a handover at a mobile station, the method comprising:
   performing an authentication process during a registration with a serving base station (SBS), wherein an authentication key is at least received or transmitted by the mobile station during the registration with the SBS;
   transmitting a handover request message to the SBS;
   receiving a handover response message including a dedicated handover ranging sequence index from the SBS, wherein the dedicated handover ranging sequence index is encrypted by the authentication key and a cipher-based message authentication code (CMAC)-key count;
   generating a dedicated handover ranging code corresponding to the dedicated handover ranging sequence index; and
   transmitting the dedicated handover ranging code to a target base station (TBS) as a first time transmission for the TBS.

2. The method according to claim 1, wherein the dedicated handover ranging code is generated when the authentication key is used as a seed of a pseudo random bit sequence (PRBS) generator.

3. The method according to claim 1, further comprising:
receiving information indicating whether or not the dedicated handover ranging code is supported prior to transmitting the handover request message.

4. The method according to claim 1, further comprising:
receiving uplink resources or downlink data from the TBS; and
performing authentication for mutually authenticating with the TBS using the uplink resources or the downlink data.

5. The method according to claim 1, wherein the handover response message includes connection update information of the TBS and information of an action time at which a handover to the TBS is performed.

6. The method according to claim 5, wherein the connection update information includes at least a basic connection identifier (BCID) for use by the TBS, a primary connection identifier (PCID) for use by the TBS, or a transport connection identifier (TCID) for use by the TBS.

7. The method according to claim 1, wherein a least significant bit (LSB) of the authentication key (AK) is used when the dedicated handover ranging code is generated.

* * * * *